(12) United States Patent
Nishikawa et al.

(10) Patent No.: US 7,578,139 B2
(45) Date of Patent: Aug. 25, 2009

(54) REFRIGERATION SYSTEM INCLUDING REFRIGERATION CYCLE AND RANKINE CYCLE

(75) Inventors: Michio Nishikawa, Nagoya (JP); Atsushi Inaba, Kariya (JP); Hironori Asa, Okazaki (JP); Hiroshi Kishita, Anjo (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 275 days.

(21) Appl. No.: 11/806,076

(22) Filed: May 29, 2007

(65) Prior Publication Data

US 2007/0289326 A1 Dec. 20, 2007

(30) Foreign Application Priority Data

May 30, 2006 (JP) .............................. 2006-150490

(51) Int. Cl.
  *F25B 1/00* (2006.01)
  *F25B 49/00* (2006.01)
  *F25B 7/00* (2006.01)
  *F25B 31/00* (2006.01)
  *F25D 15/00* (2006.01)
  *F25D 23/12* (2006.01)
  *F25D 25/00* (2006.01)
  *F01K 25/00* (2006.01)
  *F01K 19/00* (2006.01)

(52) U.S. Cl. ........................ 62/228.3; 62/228.1; 62/175; 62/192; 62/331; 62/332; 62/267; 60/671; 60/672; 60/673; 60/674; 60/675; 60/676; 60/677; 60/678; 60/679; 60/680; 60/681

(58) Field of Classification Search ................ 62/228.1, 62/228.3, 331, 332, 267, 192, 175
See application file for complete search history.

(56) References Cited

U.S. PATENT DOCUMENTS

| | | | |
|---|---|---|---|
| 6,880,344 B2 * | 4/2005 | Radcliff et al. | ................ 60/772 |
| 7,290,393 B2 * | 11/2007 | Cogswell et al. | .............. 60/651 |
| 2004/0216483 A1 * | 11/2004 | Inaba et al. | ................... 62/498 |
| 2004/0237576 A1 * | 12/2004 | Sasaki et al. | .................. 62/498 |
| 2006/0026981 A1 | 2/2006 | Inaba et al. | |

OTHER PUBLICATIONS

U.S. Appl. No. 11/709,276, filed Feb. 22, 2007, Inaba et al.

* cited by examiner

*Primary Examiner*—Cheryl J Tyler
*Assistant Examiner*—Filip Zec
(74) *Attorney, Agent, or Firm*—Posz Law Group, PLC (57) ABSTRACT

A controller reduces a rotational speed of a Rankine cycle from a predetermined normal rotational speed during an operation of a compressor in a predetermined state when the controller determines that a predicted refrigerant flow quantity, which is predicted by assuming that the compressor is operated in a sole operation of the Rankine cycle at the predetermined normal rotational speed of the Rankine cycle, exceeds a predetermined flow quantity. The predetermined state is a state that satisfies a predetermined condition, which relates to the sole operation of the Rankine cycle.

15 Claims, 8 Drawing Sheets

REFRIGERATION SYSTEM INCLUDING REFRIGERATION CYCLE AND RANKINE CYCLE

CROSS REFERENCE TO RELATED APPLICATION

This application is based on and incorporates herein by reference Japanese Patent Application No. 2006-150490 filed on May 30, 2006.

BACKGROUND OF THE INVENTION

1. Field of the Invention

The present invention relates to a refrigeration system, which includes a refrigeration cycle and a Rankine cycle.

2. Description of Related Art

Japanese Unexamined Patent Publication No. 2006-46763 (corresponding to U.S. Publication No. 2006/0026981A1) discloses one refrigeration system. This refrigeration system includes a refrigeration cycle and a Rankine cycle, which recycles waste heat of an internal combustion engine (serving as a heat generating apparatus). The refrigeration cycle includes a compressor, which compresses and discharges refrigerant, and the Rankine cycle includes an expansion device, which is operated through expansion of the refrigerant that is heated by the waste heat. A condenser of the Rankine cycle is shared with the refrigeration cycle.

In such a refrigeration system, one of a sole operation of the refrigeration cycle, a sole operation of the Rankine cycle and a simultaneous operation of both of the refrigeration cycle and the Rankine cycle is performed depending on a need for cooling a passenger compartment of the vehicle and a recoverability of the waste heat.

In the above refrigeration system, during the sole operation of the Rankine cycle, the refrigerant or lubricant oil (for lubricating devices) contained in the refrigerant may possibly be accumulated in the refrigeration cycle. This may cause a reduction in a basic performance of the Rankine cycle or insufficient lubrication of the corresponding devices of the Rankine cycle, which require lubrication. Inventors of the present application have previously proposed a technique for addressing the above disadvantage. According to this technique, the compressor is turned on and turned off at predetermined timing to limit the accumulation of the refrigerant or the lubricant oil in the refrigeration cycle.

However, when the compressor is operated during the sole operation of the Rankine cycle, a flow quantity of the refrigerant, which is supplied to the condenser, is rapidly increased. This will deteriorate the performance of the condenser. Therefore, a sufficient amount of liquid refrigerant cannot be supplied to a heating device. As a result, a pressure difference between an upstream side and a downstream side of the expansion device is reduced, and thereby the rotational drive force cannot be obtained at the expansion device. Thus, the Rankine cycle cannot function properly.

SUMMARY OF THE INVENTION

The present invention addresses the above disadvantage. Thus, it is an objective of the present invention to provide a refrigeration system, which recycles waste heat of a heat generating apparatus and enables proper functioning of a Rankine cycle even at the time of operating a compressor in a sole operation of the Rankine cycle.

To achieve the objective of the present invention, there is provided a refrigeration system that recycles waste heat of a heat generating apparatus. The refrigeration system includes a refrigeration cycle, a Rankine cycle, a control means, a predetermined state sensing means and a flow quantity determining means. The refrigeration cycle includes a compressor, a condenser, an expansion valve and an evaporator, which are connected to circulate refrigerant therethrough. The Rankine cycle shares the condenser with the refrigeration cycle and thereby includes the condenser, a pump, a heating device and an expansion device, which are connected to circulate the refrigerant therethrough. The heating device uses the waste heat of the heat generating apparatus as a heat source thereof. The control means is for controlling an operation of the refrigeration cycle and an operation of the Rankine cycle. The predetermined state sensing means is for sensing a predetermined state, which satisfies a predetermined condition that relates to a sole operation of the Rankine cycle, in which the Rankine cycle is operated while the operation of the refrigeration cycle is substantially stopped. The flow quantity determining means is for determining whether a predicted refrigerant flow quantity in the condenser exceeds a predetermined flow quantity. The flow quantity determining means predicts the predicted refrigerant flow quantity in the condenser by assuming that the compressor is operated in the sole operation of the Rankine cycle at a predetermined normal rotational speed of the Rankine cycle. The control means operates the compressor when the predetermined state is sensed by the predetermined state sensing means. The control means reduces a rotational speed of the Rankine cycle from the predetermined normal rotational speed during an operation of the compressor in the predetermined state when the flow quantity determining means determines that the predicted refrigerant flow quantity exceeds the predetermined flow quantity.

The heating device may use the waste heat of the heat generating apparatus to heat the refrigerant that is outputted from the heating device to the expansion device. The expansion device may expand the heated refrigerant supplied from the heating device and may convert energy of the expanding refrigerant into a rotational drive force during the operation of the Rankine cycle. The flow quantity determining means may use a predetermined normal rotational speed of the expansion device as the predetermined normal rotational speed of the Rankine cycle when the flow quantity determining means predicts the predicted refrigerant flow quantity in the condenser. The control means may control a rotational speed of the expansion device as the rotational speed of the Rankine cycle while using the predetermined normal rotational speed of the expansion device as the predetermined normal rotational speed of the Rankine Cycle.

The Rankine cycle may further include an electric rotating machine that is connected with the expansion device to rotate integrally with the expansion device. The electric rotating machine may be rotated by the rotational drive force transmitted from the expansion device to generate an electric power. The flow quantity determining means may use a predetermined normal rotational speed of the electric rotating machine as the predetermined normal rotational speed of the Rankine cycle when the flow quantity determining means predicts the predicted refrigerant flow quantity in the condenser. The control means may control a rotational speed of the electric rotating machine as the rotational speed of the Rankine cycle while using the predetermined normal rotational speed of the electric rotating machine as the predetermined normal rotational speed of the Rankine Cycle.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1:
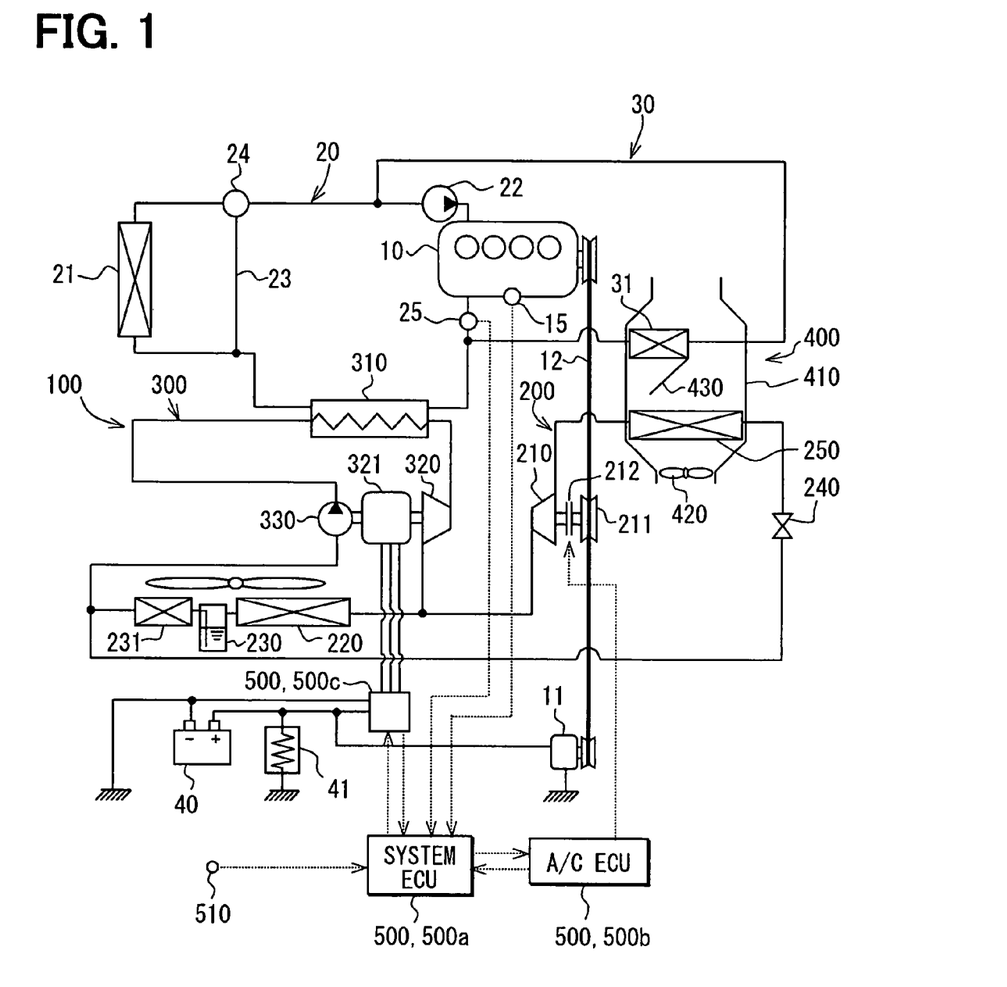
FIG. 1 is a schematic diagram showing an entire structure of a refrigeration system according to a first embodiment of the present invention.

A first embodiment of the present invention will be described with reference to FIGS. 1 to 3. First, a specific structure of the present embodiment will be described with reference to FIG. 1. A refrigeration system (hereinafter, simply referred to as "refrigeration system") 100, which includes a waste heat recycling system (a Rankine cycle), is applied to a vehicle that includes an engine 10 as a drive source. The refrigeration system 100 includes a refrigeration cycle 200 and the Rankine cycle 300, each of which is controlled by a controller (a control unit) 500.

The engine 10 is a water-cooled internal combustion engine (serving as a heat generating apparatus of the present invention) and includes a radiator circuit 20 and a heater circuit 30. Engine coolant is circulated through the radiator circuit 20 to cool the engine 10. The coolant (high temperature coolant) is used as a heat source in the heater circuit 30 to heat the conditioning air to be blown into a passenger compartment of the vehicle to adjust an interior temperature of the passenger compartment. A rotational speed sensor 15 senses the engine rotational speed and outputs a rotational speed signal, which indicates the measured engine rotational speed, to the controller 500 (more specifically, a system control ECU 500a).

An alternator 11 is provided to the engine 10. The alternator 11 is driven by a drive force of the engine 10 to generate electric power. The electric power, which is generated by the alternator 11, is supplied to and is stored, i.e., is charged in a battery 40. The electric power of the battery 40 is supplied to electrical loads (e.g., headlamps, wipers, an audio system) 41 of the vehicle, which consume the electric power.

A radiator 21 is provided to the radiator circuit 20. The radiator 21 cools the coolant, which is circulated by a coolant pump (also sometimes referred to as a water pump) 22, through heat exchange between the coolant and outside air. In this instance, the coolant pump 22 is made as an electric pump. A coolant temperature sensor 25 and a heating device (a heating type heat exchanger) 310 of the Rankine cycle 300 are provided in an outlet side flow passage (a flow passage between the engine 10 and the radiator 21), which is provided at a coolant outlet side of the engine 10. The coolant, which is outputted from the engine 10, flows through the heating device 310.

The coolant temperature sensor 25 senses a coolant temperature at the outlet side of the engine 10. A temperature signal, which is outputted from the coolant temperature sensor 25, is supplied to the controller 500 (the system control ECU 500a).

A radiator bypass flow passage 23 is provided in the radiator circuit 20 to conduct the coolant while bypassing the radiator 21. Furthermore, a thermostat 24 is provided in the radiator circuit 20 to adjust a coolant quantity, which flows through the radiator 21, and a coolant quantity, which flows through the radiator bypass flow passage 23.

A heater core 31 is provided in the heater circuit 30, and the coolant (high temperature coolant) is circulated through the heater core 31 by the coolant pump 22. The heater core 31 is received in an air conditioning case 410 of an air conditioning unit 400 to exchange heat between the conditioning air, which is blown by a blower 420, and the high temperature coolant and thereby to heat the conditioning air. An air mix door 430 is provided to the heater core 31. A flow quantity of the conditioning air, which passes through the heater core 31, is adjusted by opening/closing of the air mix door 430.

As is well known in the art, the refrigeration cycle 200 includes a compressor 210, a condenser 220, a gas-liquid separator 230, a supercooling device 231, an expansion valve 240 and an evaporator 250, which are connected in this order in a loop to form a closed circuit. The compressor 210 is a fluid device, which is driven by a drive force of the engine 10 to compress the refrigerant of the refrigeration cycle 200 and thereby produces the high temperature and high pressure refrigerant. A pulley 211, which serves as a drive means, is fixed to a drive shaft of the compressor 210. The drive force of the engine 10 is conducted to the pulley 211 through a belt 12 to drive the compressor 210. In the present embodiment, the compressor 210 is, for example, a fixed displacement compressor of a swash plate type, which is operated always with a fixed constant displacement. An electromagnetic clutch 212 is provided to the pulley 211 to couple and decouple between the compressor 210 and the pulley 211. The coupling and decoupling of the electromagnetic clutch 212 is controlled by the controller 500 (more specifically, an air conditioning control ECU 500b), which will be described in detail latter.

The condenser 220 is connected to an outlet side of the compressor 210 and functions as a heat exchanger that exchanges heat with the outside air to condense and liquefy the refrigerant. The gas-liquid separator 230 is a receiver that separates the refrigerant, which is condensed by the condenser 220, into gas phase refrigerant and liquid phase refrigerant. The supercooling device 231 is a heat exchanger that further cools the liquid refrigerant. The condenser 220, the gas-liquid separator 230 and the supercooling device 231 are constructed as a subcool condenser, which includes the gas-liquid separator. Here, it should be noted that the condenser 220, the gas-liquid separator 230 and the supercooling device 231 may be formed integrally as an integral subcool condenser, which integrally includes the gas-liquid separator.

The expansion valve 240 is a depressurizing means for depressurizing and expanding the liquid refrigerant, which is outputted from the supercooling device 231. In the present embodiment, the expansion valve 240 is a thermostatic expansion valve, a throttle opening degree of which is controlled to adjust a degree of superheat of the refrigerant supplied to the compressor 210 to a predetermined value.

Similar to the heater core 31, the evaporator 250 is provided in the air conditioning case 410 of the air conditioning unit 400. At the evaporator 250, the refrigerant, which is depressurized and is expanded by the expansion valve 240, is evaporated to cool the conditioning air, which is blown by the blower 420, by the latent heat of vaporization. The refrigerant outlet side of the evaporator 250 is connected to the inlet side of the compressor 210. A mixing ratio between the conditioning air, which is cooled by the evaporator 250, and the conditioning air, which is heated by the heater core 31, is changed according to an opening degree of the air mix door 430 to adjust the temperature of the mixed conditioning air to the preset temperature, which is preset by an occupant (e.g., a driver or a passenger) of the vehicle.

The Rankine cycle 300 recovers the waste heat energy (heat energy of the coolant), which is generated at the engine 10, and converts the recovered waste heat energy into an electric energy for further use. The Rankine cycle 300 will be described further.

The Rankine cycle 300 includes the heating device 310, an expansion device 320, the condenser 220, the gas-liquid separator 230, the supercooling device 231 and a pump 330, which are connected in this order in a loop to form a closed circuit. The condenser 220, the gas-liquid separator 230 and the supercooling device 231 of the Rankin cycle 300 are common to those of the refrigeration cycle 200, i.e., are shared with the refrigeration cycle 200. The working fluid of the Rankine cycle 300 is the same as the working fluid of the refrigeration cycle 200.

One end of a rotatable shaft of an electric motor generator 321, which functions as both of an electric motor and an electric generator, is connected to the expansion device 320, and the other end of the shaft of the electric motor generator 321 is connected to the pump 330. Thus, the expansion device 320, the electric motor generator 321 and the pump 330 are formed integrally. In the present embodiment, the expansion device 320, the electric motor generator 321 and the pump 330 may be rotated integrally at generally the same rotational speed (or may be rotated at different rotational speeds by using, for example, corresponding speed increasing or decreasing gears, if desired). An operation of the electric motor generator 321 is controlled by the controller 500 (more specifically, an inverter 500c), which will be described latter. Specifically, when the electric motor generator 321 receives electric power from the inverter 500c, which will be described latter, the electric motor generator 321 functions as the electric motor to drive (actuate) the expansion device 320 and the pump 330. In contrast, when the electric motor generator 321 receives the drive force from the expansion device 320, the electric motor generator 321 functions as the electric generator to generate the electric power, which is supplied to the battery 40 through the inverter 500c to charge the battery 40.

The pump 330 is a fluid device, which circulates the refrigerant in the Rankine cycle 300. The heating device 310 is a heat exchanger that exchanges heat between the refrigerant, which is supplied from the pump 330, and the high temperature coolant, which flows in the radiator circuit 20, to heat the refrigerant. The expansion device 320 is a fluid device, which generates the rotational drive force through expansion of the superheated vapor refrigerant, which is heated through the heating device 310. The refrigerant, which is outputted from the expansion device 320, is supplied to the above-described condenser 220.

The controller 500 includes the system control ECU 500a, the air conditioning control ECU 500b and the inverter 500c and controls the operations of the above-described devices of the refrigeration cycle 200 and of the Rankine cycle 300. The controller 500 serves as a control means, a predetermined state sensing means and a flow quantity determining means of the present invention.

The system control ECU 500a is connected with the air conditioning control ECU 500b and the inverter 500c to exchange control signals therebetween. The system control ECU 500a receives a rotational speed signal of the rotational speed sensor 15, a coolant temperature signal of the coolant temperature sensor 25 and an outside air temperature signal of an outside air temperature sensor 510, which senses an outside air temperature at the outside of the passenger compartment of the vehicle.

The system control ECU 500a performs a total control operation of the refrigeration cycle 200 and the Rankine cycle 300. Also, the system control ECU 500a enables flow of the refrigerant in the stopped refrigeration cycle 200 in response to a need during a sole operation of the Rankine cycle 300. The air conditioning control ECU 500b controls a basic operation of the refrigeration cycle 200 according to an air conditioning request of the occupant, the preset temperature and the environmental condition (e.g., the measured outside air temperature of the outside air temperature sensor 510). Furthermore, the inverter 500c drives the electric motor generator 321 as the electric motor or the electric generator to control the basic operation of the Rankine cycle 300.

Next, the operation of the refrigeration system 100 will be described below. In the refrigeration system 100 of the present embodiment, there are three possible operations, i.e., (1) a refrigeration cycle sole operation, (2) Rankine cycle sole operation and (3) a simultaneous operation of the refrigeration cycle and the Rankine cycle.

(1) Refrigeration Cycle Sole Operation

Upon receiving the air conditioning request from the occupant, when the sufficient waste heat cannot be obtained during a warm up operation of the engine 10 right after cranking of the engine 10, i.e., when the coolant temperature, which is measured with the coolant temperature sensor 25, is below a predetermined coolant temperature during the warm up operation of the engine 10 right after cranking of the engine 10, the controller 500 stops the electric motor generator 321 (resulting in the stopped state of the expansion device 320 and the pump 330) and couples the electromagnetic clutch 212 to drive the compressor 210 by the drive force of the engine 10 and thereby to implement the sole operation of the refrigeration cycle 200. In such a case, the refrigeration system 100 is operated like a refrigeration system of a normal vehicle air conditioning system.

(2) Rankine Cycle Sole Operation

In the absence of the air conditioning request from the occupant, when the coolant temperature is equal to or greater than the predetermined coolant temperature to allow the obtaining of the sufficient waste heat from the engine 10, the controller 500 decouples the electromagnetic clutch 212 (resulting in the stopped state of the compressor 210) and initially operates (actuates) the electric motor generator 321 (as well as the expansion device 320 and the pump 330) as the electric motor to implement the sole operation of the Rankine cycle 300. Then, the electric motor generator 321 is driven to generate the electric power by the rotational drive force of the expansion device 320.

In the above case, the liquid refrigerant, which is outputted from the supercooling device 231, is pressurized by the pump 330 and is heated by the high temperature engine coolant at the heating device 310 to form the superheated vapor refrigerant, which is then supplied to the expansion device 320. Then, the superheated vapor refrigerant is isentropically expanded and depressurized in the expansion device 320. At this time, some of heat energy and pressure energy (also referred to as expansion energy of the expanding refrigerant) are converted into a rotational drive force, and the electric motor generator 321 is driven by the rotational drive force, which is obtained at the expansion device 320. When the rotational drive force at the expansion device 320 is increased beyond the required drive force for driving the pump 330, the electric motor generator 321 is operated as the electric generator, which generates the electric power. This electric power, which is generated by the electric motor generator 321, is supplied to the battery 40 through the inverter 500c and is charged in the battery 40. The charged electric power is used in the operation of the respective corresponding electric loads 41 of the vehicle. In this way, a work load of the alternator 11 is reduced. The refrigerant, which is depressurized at the expansion device 320, is condensed at the condenser 220. Then, this condensed refrigerant is separated into the gas phase refrigerant and the liquid phase refrigerant at the gas-liquid separator 230 and is supercooled at the supercooling device 231. The supercooled refrigerant is then supplied into the pump 330 once again.

The control operation of the controller 500 in the Rankine cycle sole operation will be described in detail latter.

(3) Simultaneous Operation of Refrigeration Cycle and Rankine Cycle

When the controller 500 determines that the air conditioning request from the occupant is present, and the sufficient waste heat is obtainable, the controller 500 simultaneously operates both of the refrigeration cycle 200 and the Rankine cycle 300 to perform both of the air conditioning and the electric power generation.

In this case, the electromagnetic clutch 212 is coupled, and the electric motor generator 321 (as well as the expansion device 320 and the pump 330) is operated. The refrigeration cycle 200 and the Rankine cycle 300 share the condenser 220, the gas-liquid separator 230 and the supercooling device 231. The refrigerant, which is outputted from the supercooling device 231, is branched into corresponding flow passages, respectively, of the refrigeration cycle 200 and of the Rankine cycle 300. The operation of the refrigeration cycle 200 and the operation of the Rankine cycle 300 are the same as the above refrigeration cycle sole operation and the Rankine cycle sole operation, respectively.

At the time of the Rankine cycle sole operation, only the Rankine cycle 300 is operated, so that the pressure in the evaporator 250 becomes lower than the pressure of the condenser 220. Thus, the refrigerant and/or the lubricant oil contained in the refrigerant is gradually shifted from the Rankine cycle 300 into the refrigeration cycle 200 and is accumulated therein. This may possibly result in a reduced basic performance of the Rankine cycle 300 caused by a shortage of the refrigerant in the Rankine cycle 300 or may possibly result in insufficient lubrication of the corresponding devices of the Rankine cycle 300. In view of this, according to the present embodiment, the compressor 210 is operated to create a flow of the refrigerant and/or the lubricant oil, which are accumulated in the refrigeration cycle 200. Furthermore, in order to limit a rapid increase of the refrigerant, which is supplied into the condenser 220 due to the operation of the compressor 210, the rotational speed of the Rankine cycle 300 (the rotational speed of the expansion device 320 as well as the rotational speed of the pump 330) is reduced according to a need during the operation of the compressor 210.

Now, the control operation of the controller 500 in the Rankine cycle sole operation will be described in detail with reference to FIGS. 2 and 3. FIG. 2 shows an outline of the control operation of the controller 500 in the Rankine cycle sole operation of the present embodiment. The controller 500 operates the compressor 210 only for a predetermined time period Ton upon elapse of a predetermined time period Tlim from a time point of starting the sole operation of the Rankine cycle 300. At this time, when it is predicted that the refrigerant flow quantity, which is supplied to the condenser 220 due to the operation of the compressor 210, exceeds a predetermined flow quantity, the controller 500 reduces the rotational speed of the Rankine cycle 300 simultaneously with the activation of the compressor 210. In this way, the predetermined time period Trim, during which the compressor 210 is turned off, and the predetermined time period Ton, during which the compressor 210 is turned on, are repeated one after the other. The predetermined time period Ton (corresponding to a predefined time period or a first predetermined time period of the present invention) for turning on the compressor 210 is equal to or less than 100 seconds (desirably several seconds to several tens of seconds) and is set to be, for example, 60 seconds in the present embodiment. Furthermore, the predetermined time period Tlim (corresponding to a preset time period or a second predetermined time period of the present invention) for performing the Rankine cycle sole operation by turning off the compressor 210 is a time period, which is determined in view of the time required for the refrigerant and/or the lubricant oil to be substantially accumulated (for example, to a predetermined accumulation level) in the refrigeration cycle 200 during the sole operation of the Rankine cycle. In the present embodiment, this predetermined time period Tlim is set to be 60 minutes.

Figure 3:
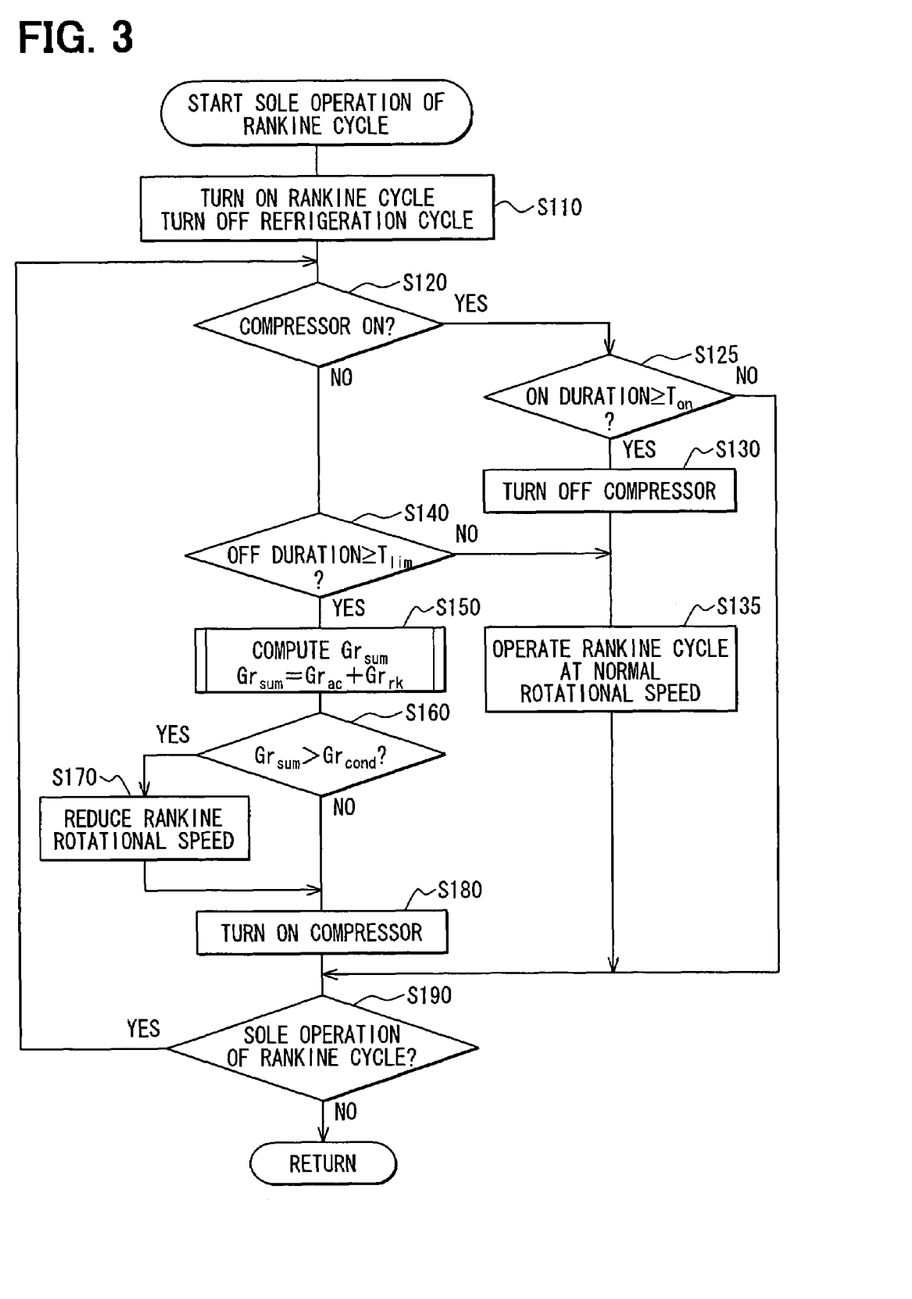
FIG. 3 is a flowchart used in a control operation of the controller during a Rankine cycle sole operation according to the first embodiment.

FIG. 3 shows a control flow of the controller 500 in the Rankine cycle sole operation. First, at step S110, the controller 500 stops the refrigeration cycle 200 and operates the Rankine cycle 300 to start the Rankine cycle sole operation. Specifically, as described above, the electromagnetic clutch 212 is decoupled (resulting in the stopped state of the compressor 210), and the electric motor generator 321 (as well as the expansion device 320 and the pump 330) is operated as the electric motor. At this time, the rotational speed of the electric motor generator (electric motor) 321 is controlled to operate the Rankine cycle 300 at a predetermined rotational speed (corresponding to a predetermined normal rotational speed of the present invention), which is determined based on, for example, the sizes (electric power consumptions) of the electrical loads of the vehicle. Here, instead of controlling the rotational speed of the electric motor generator 321, the rotational speed of the expansion device 320 may be controlled. Furthermore, at step S110, an OFF timer, which measures a duration time period of the OFF state of the compressor 210, is started.

Next, at step S120, it is determined whether the compressor 210 is turned on. When the operation proceeds from step S110 to step S120, the compressor is in the OFF state, and thereby the operation proceeds to step S140. At step S140, it is determined whether the duration time period (the value of the OFF timer), which indicates the time period of the OFF state of the compressor 210, is equal to or greater than the predetermined time period Tlim. When NO is returned at step S140, it is determined that the operation of the compressor 210 is not required, and the operation proceeds to step S135. Step S140 corresponds to a predetermined state sensing means of the present invention.

At step S135, the rotational speed (the normal rotational speed) of the Rankine cycle 300 is determined based on the sizes (the electric power consumptions) of the electrical loads of the vehicle, and the Rankine cycle 300 (the electric motor generator 321) is operated at this determined rotational speed. At this time, the rotational speed of the Rankine cycle 300 is determined in a manner that limits substantial hunting of the rotational speed of the Rankine cycle 300. After the execution of step S135, the operation proceeds to step S190.

In contrast, when YES is returned at step S140, it is then determined that the operation of the compressor 210 is required. Therefore, at step S150, a predicted refrigerant flow quantity Grsum (corresponding to a predicted refrigerant flow quantity of the present invention), which is expected to flow in the condenser 220 at the time of operating the compressor 210, is computed. Specifically, a predicted refrigerant flow quantity (corresponding to a first refrigerant flow quantity of the present invention, which relates to the operation of the compressor 210) Grac is computed based on a current rotational speed of the engine 10, which is measured with the rotational speed sensor 15. The predicted refrigerant flow quantity Grac is defined as a predicted flow quantity of refrigerant that is expected to be supplied to the condenser 220 due to the operation of the compressor 210 at the current rotational speed of the engine 10. Also, a refrigerant flow quantity (corresponding to a second refrigerant flow quantity of the present invention, which relates to the operation of the Rankine cycle 300) Grrk is computed based on the rotational speed (the normal rotational speed) of the Rankine cycle 300. The refrigerant flow quantity Grrk is defined as a flow quantity of the refrigerant, which is supplied to the condenser 220 due to the operation of the Rankine cycle 300. Then, the predicted refrigerant flow quantity Grac and the refrigerant flow quantity Grrk are summed to obtain the predicted refrigerant flow quantity Grsum. At the time of computing the predicted refrigerant flow quantity Grac and the refrigerant flow quantity Grrk, a map, which indicates a relationship between the rotational speed of the compressor 210 and the refrigerant flow quantity, and a map, which indicates a relationship between the rotational speed of the Rankine cycle 300 and the refrigerant flow quantity, may be previously stored in the controller 500 (the system control ECU 500a) and may be used to compute the predicted refrigerant flow quantity Grac and the refrigerant flow quantity Grrk, respectively.

Next, at step S160, it is determined whether the predicted refrigerant flow quantity Grsum is greater than a predetermined value Grcond (corresponding to a predetermined flow quantity of the present invention). The predetermined value Grcond is a permissible flow quantity of the refrigerant that flows into the condenser 220. In the present embodiment, the predetermined value Grcond is set to be 250 kg/h. The permissible flow quantity of the refrigerant at the condenser 220 is set to be a value, equal to or below which the operation of the Rankine cycle 300 is not influenced by a reduction in the performance of the condenser 220 caused by an increase in the flow quantity of the refrigerant at the condenser 220. Steps S140 and S160 correspond to a flow quantity determining means of the present invention.

In a case where YES is returned at step S160, it is determined that the flow quantity of the refrigerant, which is supplied to the condenser 220, becomes excessively large when the compressor 210 is operated. Thus, at step S170, the rotational speed of the Rankine cycle 300 (the rotational speed of the electric motor generator 321) is reduced. Specifically, the rotational speed of the Rankine cycle 300 is reduced in a manner that makes the predicted refrigerant flow quantity, which is expected to flow into the compressor 210 at the time of operating the compressor 210, equal to the predetermined value Grcond. At this time, as shown in FIG. 2, the rotational speed of the Rankine cycle 300 is reduced without falling below a lower limit rotational speed Rrl (corresponding to a Rankine lower limit rotational speed of the present invention), which is a minimum required rotational speed, which is required to keep the proper operation of the Rankine cycle 300. In the present embodiment, for example, the lower limit rotational speed Rrl is set to 1,700 rpm.

After the execution of step S170, the operation proceeds to step S180. When NO is returned at step S160, the operation proceeds to step S180. At step S180, the electromagnetic clutch 212 is coupled, and thereby the compressor 210 is driven. At this time, an ON timer, which measures a duration time period of the operation of the compressor 210, is started. After the execution of step S180, the operation proceeds to step S190.

When YES is returned at step S120, i.e., when it is determined that the compressor 210 is placed in the ON state at step S120, the operation proceeds to step S125. At step S125, it is determined whether the duration time period (the value of the ON timer) of the ON state of the compressor 210 is equal to or greater than a predetermined value Ton. When YES is returned at step S125, the operation proceeds to step S130. At step S130, the electromagnetic clutch 212 is decoupled, and thereby the compressor 210 is stopped. At this time, the OFF timer is started to measure the duration time period of the OFF state of the compressor 210. Then, the operation proceeds to step S135. At step S135, the rotational speed of the Rankine cycle 300 (the rotational speed of the electric motor generator 321) is returned to the normal rotational speed. Specifically, the rotational speed (the normal rotational speed) of the Rankine cycle is determined based on the sizes (the power consumptions) of the electrical loads of the vehicle. Then, the Rankine cycle 300 is operated at this determined rotational speed. After the execution of step S135, the operation proceeds to step S190. When NO is returned at step S125, the operation proceeds to step S190.

At step S190, it is determined whether the sole operation of the Rankine cycle 300 should be kept, i.e., it is determined whether the air conditioning request is absent, and the coolant temperature is equal to or greater than the predetermined coolant temperature to provide the sufficient waste heat of the engine 10. When YES is returned at step S190, the operation returns to step S120 to execute the following steps. In contrast, when NO is returned at step S190, the sole operation of the Rankine cycle 300 is terminated, and the operation returns to the main routine.

Figure 2:
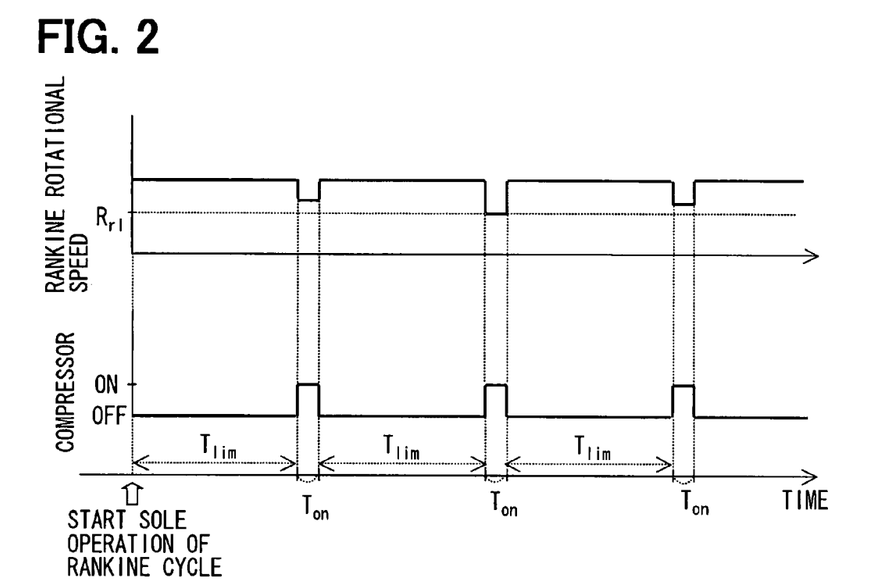
FIG. 2 is a diagram showing a control operation, which is performed by a controller in the first embodiment.

Therefore, according to the present embodiment, during the Rankine cycle sole operation, as shown in FIG. 2, when the OFF state of the compressor 210 is kept for the predetermined time period Tlim, the compressor 210 is placed in the ON state for the predetermined time period Ton. Thereafter, when the OFF state of the compressor 210 is kept for the predetermined time period Tlim, the compressor 210 is placed in the ON state for the predetermined time period Ton. Thus, the ON state and the OFF state of the compressor 210 are repeated until the end of the sole operation of the Rankine cycle 300.

As described above, at the time of the sole operation of the Rankine cycle 300, the compressor 210 is turned ON and turned OFF at the predetermined timing. Thus, it is possible to limit the accumulation of the refrigerant and/or the lubricant oil in the refrigeration cycle 200. Thereby, it is possible to limit the reduction of the basic performance of the Rankine cycle 300 caused by the shortage of the refrigerant in the Rankine cycle 300, and/or it is possible to limit the insufficient lubrication of the corresponding devices of the Rankine cycle 300. Furthermore, the predicted refrigerant flow quantity Grsum of the Rankine cycle 300, which is expected to flow into the compressor 210 at the time of operating the compressor 210, is computed in advance. When it is predicted that the predicted refrigerant flow quantity Grsum exceeds the predetermined value Grcond, the rotational speed of the Rankine cycle 300 is reduced. The reduction in the refrigerant flow quantity, which is caused by this reduced rotational speed of the Rankine cycle 300, is balanced with the increase in the refrigerant flow quantity, which is caused by the operation of the compressor 210. Therefore, it is possible to limit a rapid increase in the refrigerant, which flows into the condenser 220. In this way, even at the time of operating the compressor 210, the operational state of the Rankine cycle 300 is kept stable to maintain the normal function of the Rankine cycle 300.

At the time of determining whether the compressor 210 needs to be operated, the duration time period of the sole operation of the Rankine cycle 300 in the OFF state of the compressor 210 is measured. Then, it is determined whether this duration time period of the sole operation of the Rankine cycle 300 is equal to or greater than the predetermined time period Tlim. In this way, the simple and appropriate determination can be made. The time period Ton of the ON state of the compressor 210 is set to be equal or less than 100 seconds (e.g., 60 seconds). Thus, it is possible to limit the influences on the air conditioning performance or the deterioration in the entire energy efficiency (fuel consumption) of the refrigeration system 100 caused by the drive force of the compressor 210. Normally, when the compressor 210 is operated for the several seconds to several tens of seconds, the refrigerant and the lubricant oil can be effectively recovered.

Second Embodiment

A second embodiment of the present invention will be described with reference to FIGS. 4 to 6. In the first embodiment, at step S140 of FIG. 3, it is determined whether the duration time period, which indicates the time period of the OFF state of the compressor 210, is equal to or greater than the predetermined time period Tlim. Based on this determination, it is determined whether the compressor 210 needs to be operated. In contrast, according to the second embodiment, a difference (pressure difference) $\Delta P$ (corresponding to pressure difference related information of the present invention) between a pressure Pin at the inlet side of the expansion device 320 and a pressure Pout at the outlet side of the expansion device 320 is obtained. Then, it is determined whether the compressor 210 needs to be operated based on whether the pressure difference $\Delta P$ is less than a predetermined value $\Delta Pth$ (corresponding to a predetermined pressure difference of the present invention).

Figure 4:
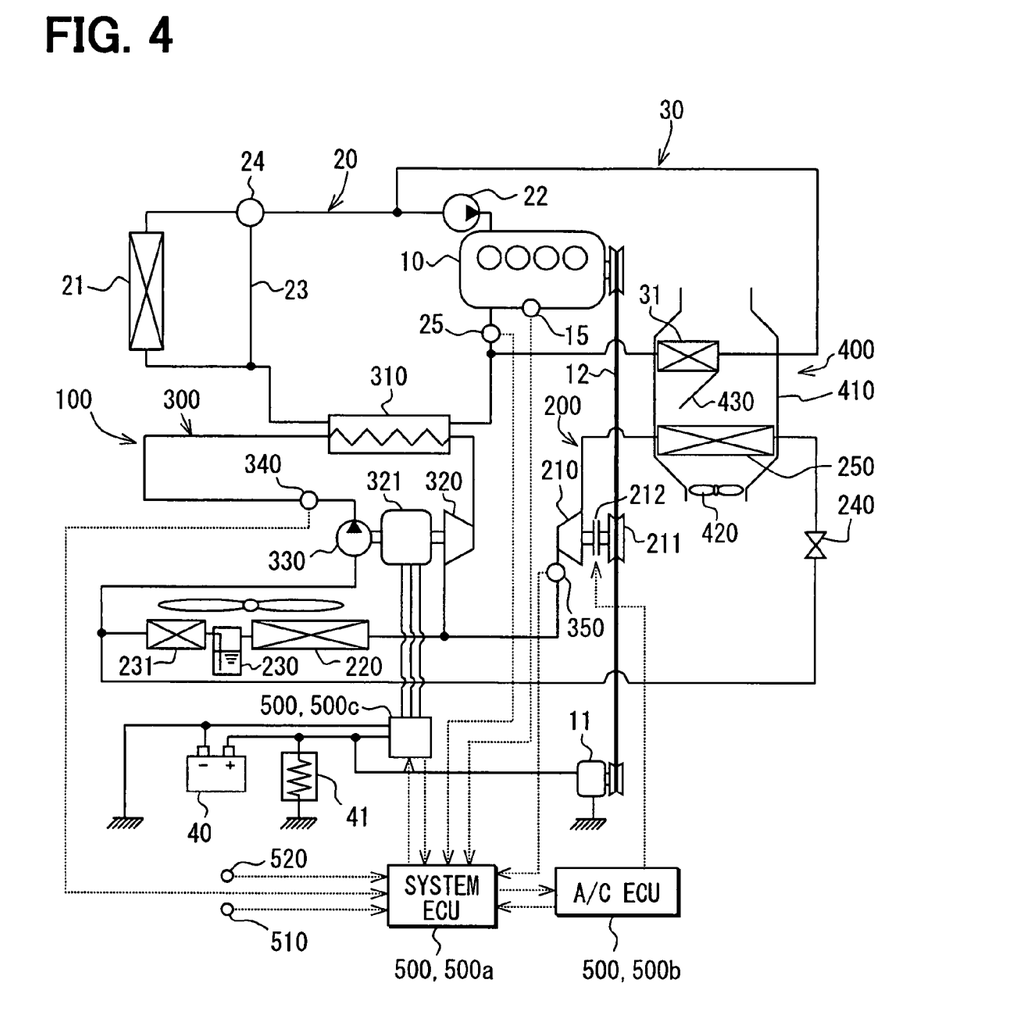
FIG. 4 is a schematic diagram showing an entire structure of a refrigeration system according to a second embodiment of the present invention.

FIG. 4 shows a specific structure of the refrigeration system of the present embodiment. An inlet pressure sensor 340 is provided to the outlet side of the pump 330 to measure the inlet side pressure Pin of the expansion device 320, and an outlet pressure sensor 350 is provided to the outlet side of the compressor 210 to measure the outlet side pressure Pout of the expansion device 320. The pressure signals from these pressure sensors 340, 350 are supplied to the controller 500 (the system control ECU 500a). The vehicle speed signal from the vehicle speed sensor 520 is supplied to the controller 500 (the system control ECU 500a). The rest of the structure of the refrigeration system 100 of the present embodiment is the same as that of the first embodiment. The controller 500 and the pressure sensors 340, 350 of the present embodiment correspond to a predetermined state sensing means of the present invention.

Figure 5:
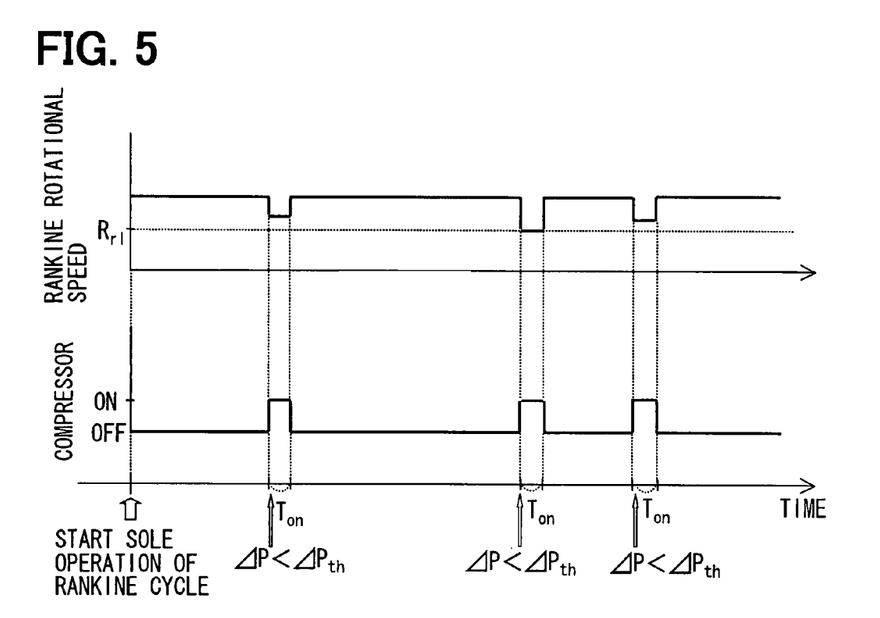
FIG. 5 is a diagram showing a control operation, which is performed by a controller in the second embodiment of the present invention.

FIG. 5 schematically shows a control operation in the sole operation of the Rankine cycle 300 of the present embodiment. After starting of the sole operation of the Rankine cycle 300, when the controller 500 senses that the pressure difference $\Delta P$ between the inlet side pressure Pin and the outlet side pressure Pout of the expansion device 320 is less than the predetermined value $\Delta Pth$, the controller 500 operates the compressor 210 only for the predetermined time period Ton. At this time, when it is predicted that the refrigerant flow quantity, which is supplied to the condenser 220 due to the operation of the compressor 210, exceeds a predetermined flow quantity, the controller 500 reduces the rotational speed of the Rankine cycle 300 simultaneously with the activation of the compressor 210. In the present embodiment, the predetermined time period Ton of the compressor 210 is 60 seconds, like in the first embodiment.

Figure 6:
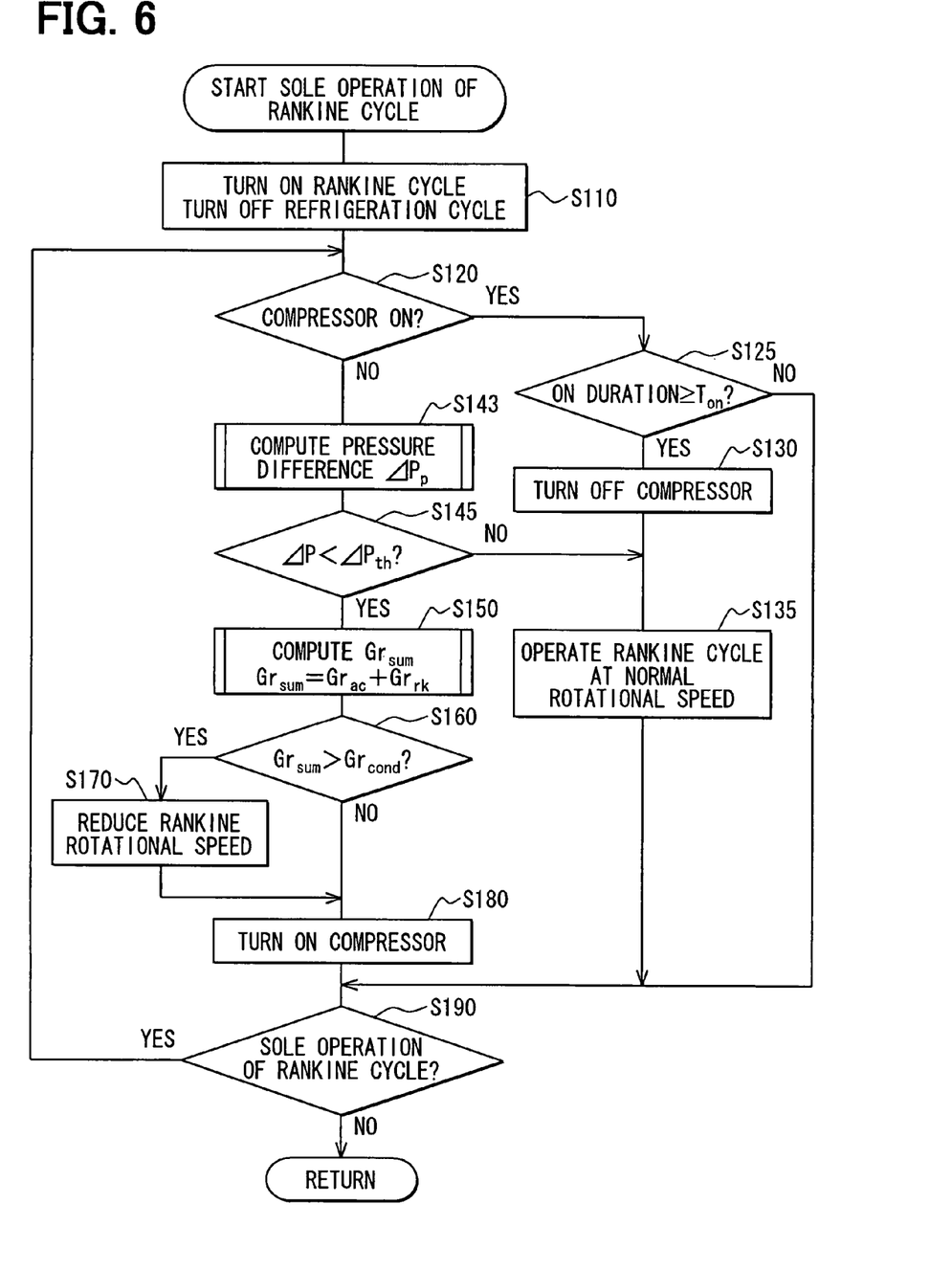
FIG. 6 is a flowchart used in a control operation of the controller at the time of Rankine cycle sole operation according to the second embodiment.

FIG. 6 shows a control flow of the controller 500 in the sole operation of the Rankine cycle 300 according to the present embodiment. Step S140 of FIG. 3 of the first embodiment is replaced with steps S143 and S145 in the present embodiment. The other steps are similar to those of the first embodiment. However, although the OFF timer is started at steps S110 and S130 in the first embodiment, the OFF timer is not used in the present embodiment.

At step S143, the controller 500 computes an appropriate pressure difference $\Delta Pp$, which is a desirable value of the pressure difference $\Delta P$ between the inlet side pressure Pin and the outlet side pressure Pout of the expansion device 320. The appropriate pressure difference $\Delta Pp$ is computed based on the outside air temperature signal from the outside air temperature sensor 510, the vehicle speed signal from the vehicle speed sensor 520, the coolant temperature signal (a waste heat temperature signal indicating a temperature of the waste heat) from the coolant temperature sensor 25 and the rotational speed of the Rankine cycle 300. Furthermore, the predetermined value $\Delta Pth$, which is used as a threshold value in the determination process at step S145, is computed based on this appropriate pressure difference $\Delta Pp$. The threshold value $\Delta Pth$ may be computed as a product ($\Delta Pth = \Delta Pp \times 0.8$), which is obtained by multiplying the appropriate pressure difference $\Delta Pp$ with 0.8.

At step S145, the actual pressure difference $\Delta P$ (=Pin−Pout) is computed based on the pressure signal of the inlet pressure sensor 340, which indicates the inlet side pressure Pin of the expansion device 320, and the pressure signal of the outlet pressure sensor 350, which indicates the outlet side pressure Pout of the expansion device 320. Then, it is determined whether this actual pressure difference $\Delta P$ is less than the threshold value $\Delta Pth$. When YES is returned at step S145, it implies that the liquid refrigerant in the Rankine cycle 300 is insufficient, and thereby the pressure difference $\Delta P$ is reduced, so that the operation of the compressor 210 is required. Therefore, the operation proceeds to step S150. When NO is returned at step S145, it is determined that operation of the compressor 210 is not required, and the operation proceeds to step S135.

Steps S143 and S145 of the present embodiment correspond to the predetermined state sensing means of the present invention.

As discussed above, according to the present embodiment, the inlet side pressure Pin and the outlet side pressure Pout of the expansion device 320 are measured with the pressure sensors 340, 350. Based on these pressures Pin, Pout, it is determined whether the actual pressure difference ΔP between the inlet side and the outlet side of the expansion device 320 is less than the threshold value ΔPt. Then, based on this determination, it is determined whether the operation of the compressor 210 is required. Thus, the state, which requires the operation of the compressor 210, can be more accurately sensed, and thereby the compressor 210 can be operated at the appropriate timing.

Third Embodiment

Figure 7:
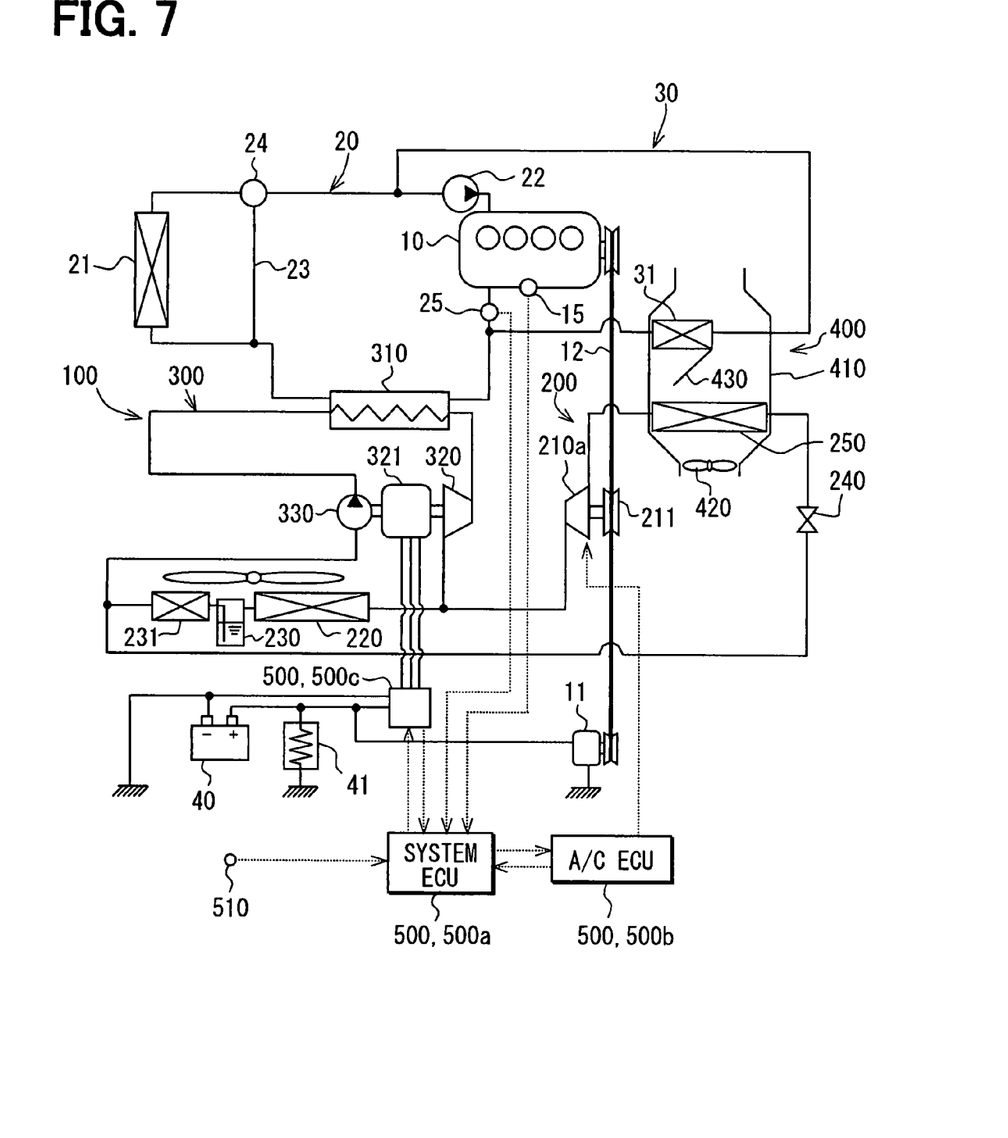
FIG. 7 is a schematic diagram showing an entire structure of a refrigeration system according to a third embodiment of the present invention.

A third embodiment of the present invention will be described with reference to FIG. 7. In each of the above embodiments, the compressor 210 is the fixed displacement compressor, which is always operated at the fixed displacement. In contrast, according to the present embodiment, a compressor 210a is a variable displacement compressor, a displacement per rotation of which can be changed by an external control signal. Specifically, the compressor 210a is a variable displacement compressor of a swash plate type, in which a tilt angle of a swash plate is changed to change a displacement of the compressor 210a. In this instance, the displacement of the compressor 210a is controlled by the controller 500 (the air conditioning control ECU 500b) in a range of 0 to 100%. The electromagnetic clutch 212, which is provided between the pulley 211 and the compressor 210 in each of the above embodiments, is eliminated in this embodiment.

In the present embodiment, a control operation, which is similar to that of FIG. 3, is performed by the controller 500. However, the electromagnetic clutch 212 is not provided. Thus, ON/OFF of the compressor 210 by the coupling/decoupling of the electromagnetic clutch 212 discussed in each of the above embodiments is not performed. Instead of this, the displacement of the compressor 210a is controlled. During the operation of the refrigeration cycle 200 (the sole operation of the refrigeration cycle 200 and the simultaneous operation of the Rankine cycle 300), the displacement of the compressor 210a is linearly controlled according to a cooling load, which is determined based on the engine rotational speed signal of the rotational speed sensor 15 and the outside air temperature signal of the outside air temperature sensor 510. In the stop state of the refrigeration cycle 200, the displacement of the compressor 210a is controlled to about 0%.

During the sole operation of the Rankine cycle 300, at step S150 of FIG. 3, the predicted refrigerant flow quantity Grsum is computed by assuming that the compressor 210a is operated at a predetermined lower limit output displacement VI (corresponding to a compressor lower limit displacement of the present invention), which enables the proper operation of the compressor 210a. Then, when the compressor 210a is operated at step S180, the compressor 210a is operated at the lower limit displacement VI. Furthermore, when the compressor 210a is stopped at step S130, the displacement of the compressor 210a is generally controlled to 0% like at the time of stopping the refrigeration cycle 200.

As described above, in the case of the variable displacement compressor 210a, the displacement of the compressor 210a is controllable. Thus, when the compressor 210a is operated during the sole operation of the Rankine cycle 300, the compressor 210a is operated at the lower limit displacement VI, so that the refrigerant and/or the lubricant oil of the refrigeration cycle 200 can be returned to the Rankine cycle 300 while minimizing the influences on the operation of the Rankine cycle 300 by limiting the increase in the refrigerant flow quantity Grac, which is caused by the operation of the compressor 210a.

Fourth Embodiment

Figure 8:
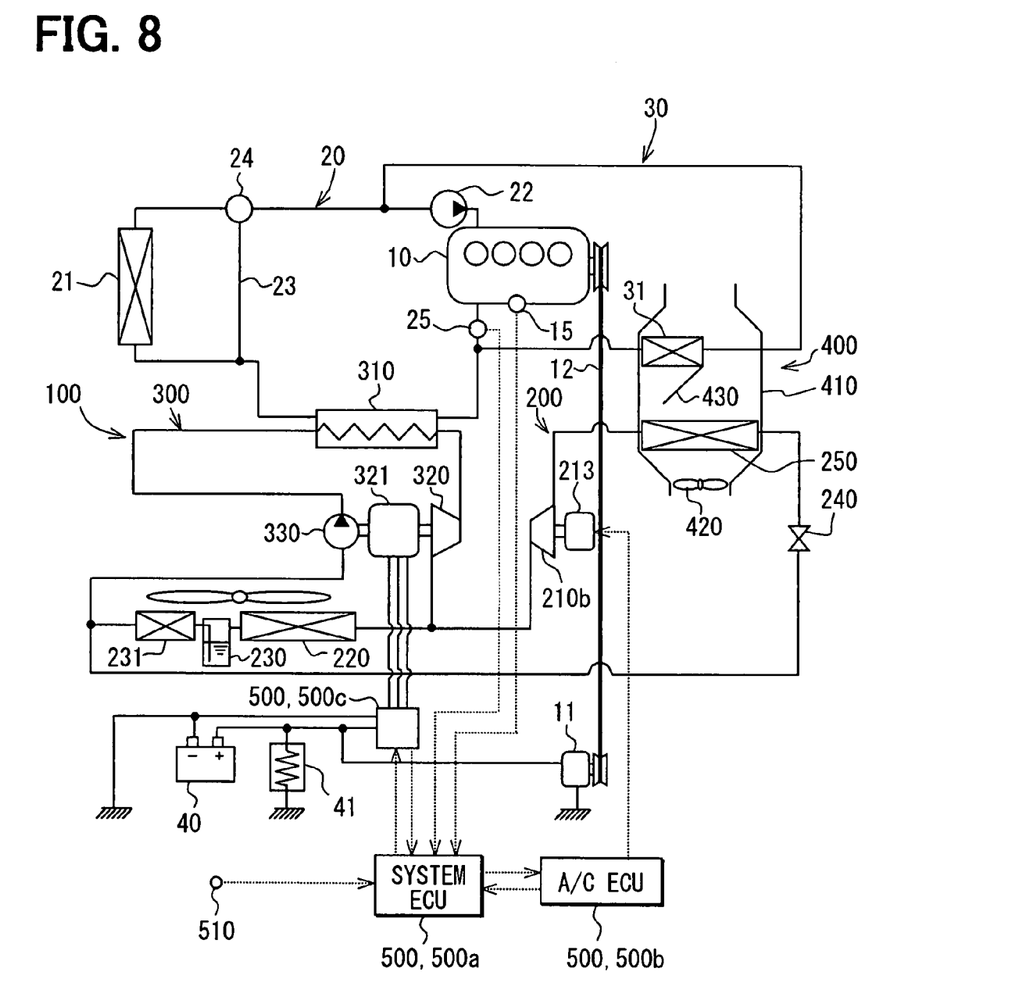
FIG. 8 is a schematic diagram showing an entire structure of a refrigeration system according to a fourth embodiment of the present invention.

A fourth embodiment of the present invention will be described with reference to FIG. 8. In each of the above embodiments, the compressor 210 is driven by the engine 10. In contrast, according to the present embodiment, the compressor 210b is an electric compressor, which is driven by an electric motor 213. Electric power is supplied to the electric motor 213 through an inverter (not shown). The controller 500 (the air conditioning control ECU 500b) controls an operation of the electric motor 213 through this inverter. In each of the above embodiments, the compressor 210, 210a is driven by the engine 10. Therefore, the rotational speed of the compressor 210, 210a cannot be freely controlled. In contrast, according to the present embodiment, the rotational speed of the compressor 210b can be controlled according to, for example, the cooling load by controlling the rotational speed of the electric motor 213.

In the present embodiment, the control operation, which is similar to that of FIG. 3, is performed by the controller 500 like in the first embodiment. However, unlike the first embodiment, in which ON/OFF of the compressor 210 is performed by coupling/decoupling of the electromagnetic clutch 212, ON/OFF of the compressor 210b is performed by ON/OFF of the electric motor 213 in the present embodiment.

During the sole operation of the Rankine cycle 300, at step S150 of FIG. 3, the predicted refrigerant flow quantity Grsum is computed by assuming that the compressor 210b is operated at a predetermined lower limit rotational speed Rcl (corresponding to a compressor lower limit rotational speed of the present invention), which enables the proper operation of the compressor 210b. Then, when the compressor 210b is operated at step S180, the compressor 210b is operated at the lower limit rotational speed Rcl.

As described above, in the case of the electric compressor 210b, the rotational speed of the compressor 210b is controllable. Thus, when the compressor 210b is operated during the sole operation of the Rankine cycle 300, the compressor 210b is operated at the lower limit rotational speed Rcl, so that the refrigerant and/or the lubricant oil of the refrigeration cycle 200 can be returned to the Rankine cycle 300 while minimizing the influences on the operation of the Rankine cycle 300 by limiting the increase in the refrigerant flow quantity Grac, which is caused by the operation of the compressor 210b.

(Modifications)

In each of the above embodiments, when the predicted refrigerant flow quantity Grsum is computed, the predicted refrigerant flow quantity Grac, which is caused by the operation of the compressor 210, and the refrigerant flow quantity Grrk, which is caused by the operation of the Rankine cycle 300, are computed based on the rotational speed of the compressor 210 and the rotational speed of the Rankine cycle 300, respectively. Alternatively, the refrigerant flow quantity Grrk, which is caused by the operation of the Rankine cycle 300, may be directly measured with a flow quantity sensor provided at an inlet or an outlet of the pump 330.

In each of the above embodiments, at step S170 shown in FIGS. 3 and 6, the rotational speed of the Rankine cycle 300 is reduced without falling below the lower limit rotational speed Rrl in such a manner that the predicted refrigerant flow quantity Grsum, which is computed at step S150, is reduced to the predetermined value Grcond. Alternatively, when the predicted refrigerant flow quantity Grsum exceeds the predetermined value Grcond, the rotational speed of the Rankine cycle 300 may be always reduced to the lower limit rotational speed Rrl regardless the value of the predicted refrigerant flow quantity Grsum.

In the second embodiment, at steps S143 and S145, the inlet side pressure Pin and the outlet side pressure Pout of the expansion device 320 are measured with the pressure sensors 340, 350, respectively, and the actual pressure difference ΔP, which is obtained based on the measured inlet side pressure Pin and the measured outlet side pressure Pout, is compared with the threshold value ΔPth to determine whether the current state permits the normal proper operation of the Rankine cycle 300. Alternatively, for example, a liquid quantity sensor, which measures a liquid quantity of the gas-liquid separator 230, may be provided. When the measured liquid quantity (corresponding to a pressure difference related information of the present invention), which is measured with the liquid quantity sensor, is less than a predetermined value, it may be determined that the pressure difference between the inlet side and the outlet side of the expansion device 320 is not sufficient (i.e., not in the state that permits the normal operation of the Rankine cycle 300).

Further alternatively, a temperature sensor and a pressure sensor may be provided to the outlet of the supercooling device 231. A degree of supercooling (corresponding to the pressure difference related information of the present invention) may be computed based on the measured temperature and the measured pressure of the refrigerant, which are measured with the temperature sensor and the pressure sensor, respectively. When the degree of supercooling is less than a predetermined value, it may be determined that the pressure difference between the inlet side and the outlet side of the expansion device 320 is not sufficient. Further alternatively, a flow quantity sensor may be provided to the inlet side or the outlet side of the pump 330. When a refrigerant flow quantity (corresponding to the pressure difference related information of the present invention), which is measured with the flow quantity sensor, is less than a predetermined value, it may be determined that the pressure difference between the inlet side and the outlet side of the expansion device 320 is not sufficient.

In the first embodiment, at step S140 of FIG. 3, it is determined whether the duration time period of the OFF state of the compressor 210 is equal to or greater than the predetermined time period Tlim, and based on the result of this determination, it is determined whether the compressor 210 needs to be operated. In the second embodiment, at step S145 of FIG. 6, it is determined whether the pressure difference ΔP between the inlet side and the outlet side of the expansion device 320 is less than the predetermined value ΔPth, and based on the result of this determination, it is determined whether the compressor 210 needs to be operated. Alternatively, the above determinations of the first embodiment and of the second embodiment may be combined as follows. That is, when the pressure difference ΔP between the inlet side and the outlet side of the expansion device 320 is less than the predetermined value ΔPth, and the duration time period of the OFF state of the compressor 210 is equal to or greater than the predetermined time period Tlim, it may be determined that the compressor 210 needs to be operated.

In each of the above embodiments, in order to limit the shortage of the refrigeration during the sole operation of the Rankine cycle 300 caused by the accumulation of the refrigerant in the refrigeration cycle 200, the compressor 210 is operated (turned ON-OFF) during the sole operation of the Rankine cycle 300. Alternatively, for example, the compressor 210 may be operated for a predetermined time period at the time (corresponding to a predetermined state of the present invention), which is immediately before the sole operation of the Rankine cycle 300. In such a case, after starting the operation of the compressor 210, the Rankine cycle 300 may be operated during the operation of the compressor 210 (during the predetermined time period). At this time, similar to each of the above embodiments, the predicted refrigerant flow quantity Grsum, which is supplied to the condenser 220 at the time of operating the Rankine cycle 300 at the normal rotational speed simultaneously with the operation of the compressor 210, may be computed. Then, when it is determined that the predicted refrigerant flow quantity Grsum exceeds the predetermined value Grcond, the Rankine cycle may be operated at the reduced rotational speed, which is lower than the normal rotational speed.

Figure 9:
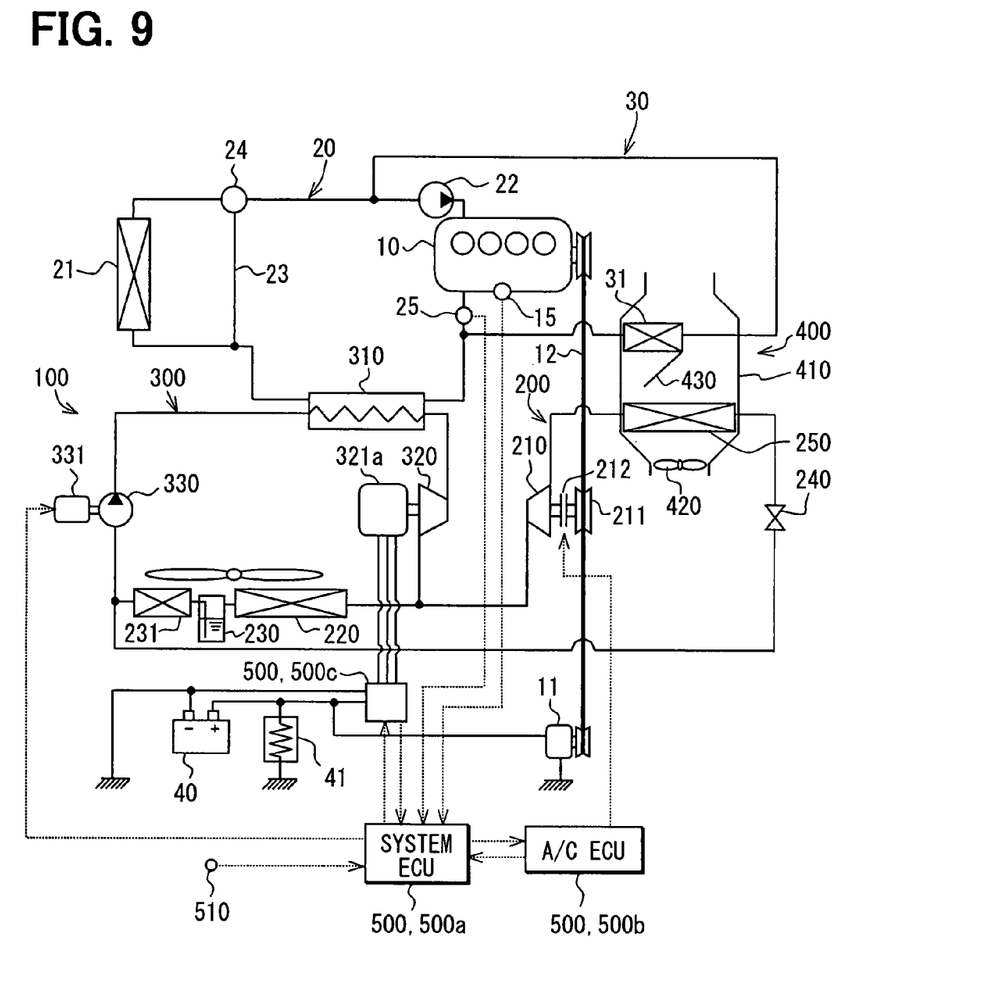
FIG. 9 is a schematic diagram showing a modification of the refrigeration system of the first embodiment.

In each of the above embodiments, the pump 330 is connected to the electric motor generator 321, to which the expansion device 320 is also connected. Alternatively, as shown in FIG. 9, the pump 330 may be separated from the electric motor generator (the electric generator) 321, and a dedicated electric motor 331 may be provided separately from the electric motor generator 321 as a drive source of the pump 330. Electric power may be supplied to the electric motor 331 through an inverter (not shown), and the controller 500 (the system control ECU 500a) may control an operation of the electric motor 331 through this inverter. In such a case, the electric generator 321a, which does not have the function of the electric motor, may be connected to the expansion device 320 in place of the electric motor generator 321, and the rotational speed of the Rankine cycle 300 may be controlled by controlling the rotational speed of the electric motor 331, which is connected to the pump 330. Thus, at the time of operating the Rankine cycle 300 at the normal rotational speed at steps S110 and S135 shown in FIGS. 3 and 6, or at the time of reducing the rotational speed of the Rankine cycle 300 at step S170 of FIGS. 3 and 6, the rotational speed of the electric motor 331 may be controlled. Here, it should be noted that the electric motor generator 321 of the first to fourth embodiments shown and described with reference to FIGS. 1 to 8 and the electric generator 321a of the modification shown and described with reference to FIG. 9 may be collectively referred to as an electric rotating machine.

In each of the above embodiments, the supercooling device 231 is provided in the refrigeration cycle 200. Alternatively, the supercooling device 231 may be eliminated from the refrigeration cycle 200 depending on the required cooling capacity.

Furthermore, in each of the above embodiments, the vehicle engine (the internal combustion engine) 10 is used as the heat generating apparatus. Alternatively, the heat generating apparatus may be any other suitable device, such as an external combustion engine, a fuel cell stack of a fuel cell vehicle, various types of motors, or an inverter, which generates heat upon operation thereof and wastes a portion of that heat (generating the waste heat).

Additional advantages and modifications will readily occur to those skilled in the art. The invention in its broader terms is therefore not limited to the specific details, representative apparatus, and illustrative examples shown and described.

What is claimed is:

1. A refrigeration system that recycles waste heat of a heat generating apparatus, the refrigeration system comprising:

a refrigeration cycle that includes a compressor, a condenser, an expansion valve and an evaporator, which are connected to circulate refrigerant therethrough;

a Rankine cycle that shares the condenser with the refrigeration cycle and thereby includes the condenser, a pump, a heating device and an expansion device, which are connected to circulate the refrigerant therethrough, wherein the heating device uses the waste heat of the heat generating apparatus as a heat source thereof;

a control means for controlling an operation of the refrigeration cycle and an operation of the Rankine cycle;

a predetermined state sensing means for sensing a predetermined state, which satisfies a predetermined condition that relates to a sole operation of the Rankine cycle, in which the Rankine cycle is operated while the operation of the refrigeration cycle is substantially stopped; and a flow quantity determining means for determining whether a predicted refrigerant flow quantity in the condenser exceeds a predetermined flow quantity, wherein the flow quantity determining means predicts the predicted refrigerant flow quantity in the condenser by assuming that the compressor is operated in the sole operation of the Rankine cycle at a predetermined normal rotational speed of the Rankine cycle, wherein:

the control means operates the compressor when the predetermined state is sensed by the predetermined state sensing means; and the control means reduces a rotational speed of the Rankine cycle from the predetermined normal rotational speed during an operation of the compressor in the predetermined state when the flow quantity determining means determines that the predicted refrigerant flow quantity exceeds the predetermined flow quantity.

2. The refrigeration system according to claim 1, wherein the control means operates the compressor for a predefined time period and then stops the compressor when the predetermined state sensing means senses the predetermined state.

3. The refrigeration system according to claim 2, wherein the control means returns the rotational speed of the Rankine cycle to the predetermined normal rotational speed when the control means stops the compressor after the operation of the compressor for the predefined time period.

4. The refrigeration system according to claim 2, wherein the predefined time period is equal to or less than 100 seconds.

5. The refrigeration system according to claim 1, wherein when the control means reduces the rotational speed of the Rankine cycle from the predetermined normal rotational speed, the control means reduces the rotational speed of the Rankine cycle to a rotational speed that reduces the refrigerant flow quantity in the condenser to the predetermined flow quantity.

6. The refrigeration system according to claim 1, wherein when the control means reduces the rotational speed of the Rankine cycle from the predetermined normal rotational speed, the control means reduces the rotational speed of the Rankine cycle to a lower rotational speed that is lower than the predetermined normal rotational speed and is equal to or greater than a Rankine lower limit rotational speed, which is a predetermined lower limit rotational speed for operating the Rankine cycle.

7. The refrigeration system according to claim 1, wherein:
the compressor is driven by a rotational drive force, which is generated from the heat generating apparatus; and the flow quantity determining means predicts the predicted refrigerant flow quantity based on a rotational speed of the heat generating apparatus.

8. The refrigeration system according to claim 7, wherein:
the compressor is a variable displacement compressor, an outlet displacement per rotation of which is variable;
the flow quantity determining means predicts the predicted refrigerant flow quantity by assuming that the compressor is operated at a compressor lower limit displacement, which is a predetermined lower limit displacement of the compressor for operating the compressor; and
the control means operates the compressor at the compressor lower limit displacement when the predetermined state is sensed by the predetermined state sensing means.

9. The refrigeration system according to claim 1, wherein:
the compressor is an electric compressor, which is driven by an electric motor;
the flow quantity determining means predicts the predicted refrigerant flow quantity by assuming that the compressor is operated at a compressor lower limit rotational speed, which is a predetermined lower limit rotational speed of the compressor for operating the compressor; and
the control means operates the compressor at the compressor lower limit rotational speed when the predetermined state is sensed by the predetermined state sensing means.

10. The refrigeration system according to claim 1, wherein:
the flow quantity determining means computes a first refrigerant flow quantity, which relates to the operation of the compressor, and a second refrigerant flow quantity, which relates to the operation of the Rankine cycle; and
the flow quantity determining means computes a sum of the first refrigerant flow quantity and the second refrigerant flow quantity as the predicted refrigerant flow quantity.

11. The refrigeration system according to claim 1, wherein the predetermined state sensing means senses a state, in which the sole operation of the Rankine cycle has been continued for a preset time period or longer, as the predetermined state.

12. The refrigeration system according to claim 1, wherein:
the predetermined state sensing means obtains pressure difference related information, which relates to a pressure difference between a pressure at an inlet side of the expansion device and a pressure at an outlet side of the expansion device; and
the predetermined state sensing means senses a state, in which the pressure difference indicated by the pressure difference related information is less than a predetermined pressure difference during the sole operation of the Rankine cycle, as the predetermined state.

13. The refrigeration system according to claim 12, wherein:
the heat generating apparatus is an internal combustion engine of a vehicle; and
the predetermined state sensing means computes the predetermined pressure difference based on an outside air temperature at an outside of the vehicle, a vehicle speed, a temperature of the waste heat and a rotational speed of the Rankine cycle.

14. The refrigeration system according to claim 1, wherein:
the heating device uses the waste heat of the heat generating apparatus to heat the refrigerant that is outputted from the heating device to the expansion device;
the expansion device expands the heated refrigerant supplied from the heating device and converts energy of the expanding refrigerant into a rotational drive force during the operation of the Rankine cycle;

the flow quantity determining means uses a predetermined normal rotational speed of the expansion device as the predetermined normal rotational speed of the Rankine cycle when the flow quantity determining means predicts the predicted refrigerant flow quantity in the condenser; and the control means controls a rotational speed of the expansion device as the rotational speed of the Rankine cycle while using the predetermined normal rotational speed of the expansion device as the predetermined normal rotational speed of the Rankine Cycle.

15. The refrigeration system according to claim 1, wherein:

the heating device uses the waste heat of the heat generating apparatus to heat the refrigerant that is outputted from the heating device to the expansion device;

the Rankine cycle further includes an electric rotating machine that is connected with the expansion device to rotate integrally with the expansion device;

the expansion device expands the heated refrigerant supplied from the heating device and converts energy of the expanding refrigerant into a rotational drive force during the operation of the Rankine cycle;

the electric rotating machine is rotated by the rotational drive force transmitted from the expansion device to generate an electric power;

the flow quantity determining means uses a predetermined normal rotational speed of the electric rotating machine as the predetermined normal rotational speed of the Rankine cycle when the flow quantity determining means predicts the predicted refrigerant flow quantity in the condenser; and the control means controls a rotational speed of the electric rotating machine as the rotational speed of the Rankine cycle while using the predetermined normal rotational speed of the electric rotating machine as the predetermined normal rotational speed of the Rankine Cycle.

* * * * *